United States Patent Office 2,710,481
Patented June 14, 1955

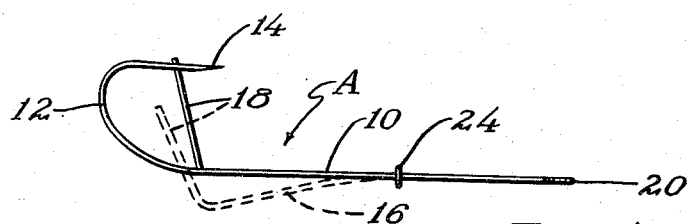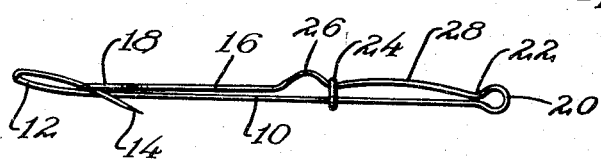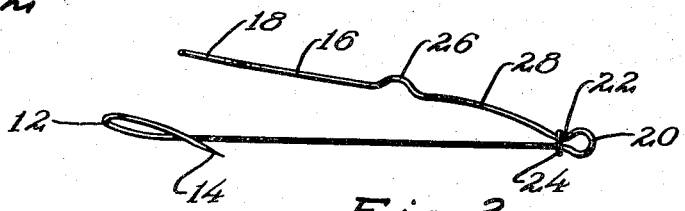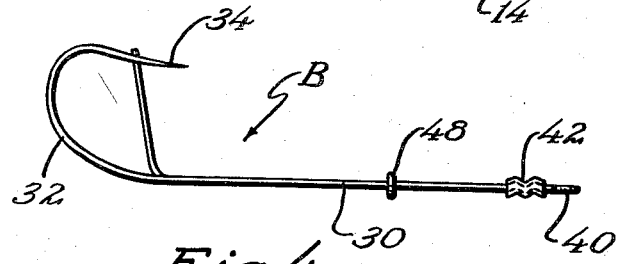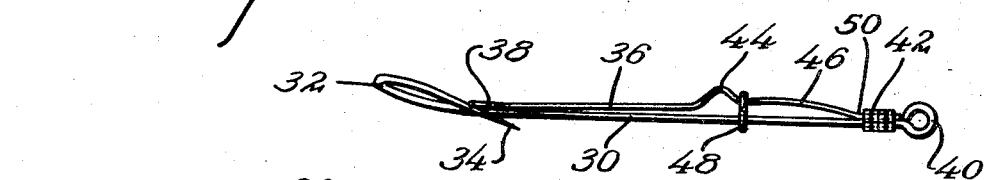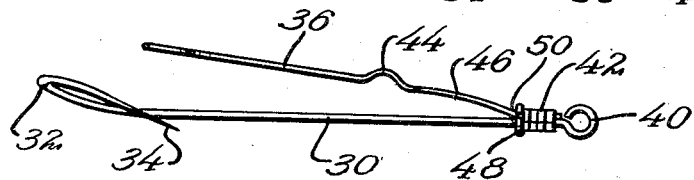

2,710,481
FISH HOOK
Herbert E. Matthes, St. Paul, Minn.
Application July 28, 1951, Serial No. 239,080
7 Claims. (Cl. 43—44.8)

This invention relates to an improved fish hook and more particularly to a type of fish hook having a spring guard forming a part thereof.

In a fish hook of this character, a guard element extends across the opening formed by the bill of the hook, and is deflected by the mouth of the fish taking the hook in such a way that the escape of the fish is thereafter prevented. One of the most posing problems has been to produce such a hook that will be effective in catching and securing a fish, and at the same time which may be easily manufactured in quantity lots.

Accordingly, one object of the invention is to provide a hook having a guard element, and which is so designed that it can be easily and economically fabricated.

Another object is to provide a hook of this type which is arranged to permit facile baiting of the bill portion of the hook or the guard thereof, whichever is desired. In this connection, it is to be noted that my hook is designed so that the guard can be moved into spaced relation to the pointed end of the hook by using only one hand, thereby leaving the other hand available for holding the bait during such an operation. This construction also permits a fisherman to more easily remove a fish from the hook. At the same time a positive means is provided for retaining the fish on the hook until removal is desired.

An added feature of my invention lies in the provision of a hook having a bill end and an adjoining shank, and a guard having a guard element and an adjoining shank, and in so connecting the ends of the shanks most remote from the bill end and guard element that they tend to diverge apart. Slidable means is provided which is designed to overcome the relative diverging tendency of the two shanks when said means is moved in one direction and to permit divergence of the shanks when the means is moved in the other direction.

In conjunction with the preceding feature, another object of the invention is to provide a means for retaining the slidable means in either of its two directional positions to thereby assure that the guard is maintained either in engagement with one side of the curved bill or in an open position with respect to said bill.

Another feature of the invention resides in the employment of a collar or ring which slidably encircles the guard and hook shanks, and to bind a portion of the guard shank in such a plane that deflection of the guard element by a fish biting the hook will not permit slippage of the collar at this time.

A still further feature of the invention resides in the provision of a loop end for the hook, which serves as an eye for the threading of the fish line therethrough, a bent portion in the guard shank spaced from the looped end, and an intermediate bowed portion, the loop, and the bent and bowed portions all lying in the same plane, which simplifies the designing of the dies for mass production of my hook. In connection with the foregoing, it will be understood that the loop end limits movement of a ring in one direction, the bent portion in the other direction, and that the bowed portion acts to maintain the ring in the direction it is manually moved.

A further object of one form of the invention is to provide a hook of heavy construction, such as that used in deep sea fishing, having a guard element of lighter weight material which is more easily flexed. Therefore, it is within the purview of the invention to make the hook and guard shanks in two parts, the two shanks being secured together adjacent one end.

The above objects, and other objects of my invention will be made more apparent hereinafter, are obtained by means of structure subsequently to be described and shown in the accompanying drawing, wherein:

Figure 1 is an elevational view showing one construction of my hook, this figure showing in dotted outline the partially flexed position of the guard when the hook is taken by a fish;

Figure 2 is a top plan view with the parts in the position of Figure 1;

Figure 3 is similar to Fig. 2 but with the guard element in open or released position;

Figure 4 is an elevational view showing another embodiment of the invention;

Figure 5 is a top plan view of the embodiment of Figure 4; and

Figure 6 is a plan view similar to Fig. 5 but with the guard element in open position.

Referring now to Figures 1, 2 and 3, the fish hook A comprises an elongated shank 10 having a curved end 12 which terminates in a pointed extremity 14. Extending along one side of the shank 10 is a guard shank 16 having an inclined or upturned guard element 18 thereon. From Figures 1 and 2 it will be observed that the guard element 18 is in lateral engagement with the curved portion 12 when the guard element is urged into closed position by means presently to be described. The ends of the shanks 10 and 16 lying opposite the curved portion 12 and the guard element 18 are connected by a loop portion 20, the loop 20 forming a ready means for the attachment of a fishing line.

As will be seen from Figure 3, the shank 16 is biased outwardly from the shank 10 to provide a diverging relationship therewith. This may be readily accomplished by bending the shank 16 at a locus 22 adjacent the connection of the shank with the loop portion 20.

Slidably embracing both the hook shank 10 and the guard shank 16 is a ring element 24. The shank 16 is preferably suitably bent at 26 to form an obstruction or promontory which limits the axial movement of the ring 24 in a direction toward the guard element 18, the loop 20 serving as a ready means for limiting movement of the ring 24 in an opposite direction. In order to provide means for holding the ring 24 adjacent either the bent portion 26 or the loop portion 20, the shank 16 is preferably bowed outwardly intermediate these points, which bowed portion has been designated by the reference numeral 28.

It is to be noted that the bent and bowed portions 26 and 28, respectively, reside in the same plane with the loop 20, which of course facilitates manufacture in that the dies can be more simply designed. Also, by having the bent portion 26 in a plane substantially normal to the general plane in which the guard element 18 is deflected by a fish, it will be observed that the ring 24 is not released or freed by such deflection, as would be the case if such bent portion 26 were in the plane of deflection.

The operation of my fish hook is believed obvious from the foregoing description. However, it is to be observed that when the fish hook A is to be baited, the ring element 24 is slidably moved into abutting relationship with the loop 20. In that the shank 16 is biased into diverging relationship with the hook shank 10, the entire shank 16 assumes the position depicted in Figure 3. It will be appreciated that the ring 24 may be manipulated from the position shown in Figure 2 to that shown in Figure 3 by merely placing the thumb of one hand against the end of the loop 20 and pulling the ring with two fingers of the same hand. By so doing, the fisherman's other hand remains free for holding the bait during such a manual operation.

After the curved portion 12 or the shank 18 has been baited, the ring 24 is then moved to the position shown in Figure 2, thereby forcing the guard element 18 into side by side engagement with the curved portion 12. The hook A is then ready for use. As best observed from Figure 1, the guard element 18 will be deflected downwardly in substantially the plane of the curved portion 12 when a fish takes the hook, such a deflected relation of the guard element 18 being shown in dotted outline in this figure. The lip of the fish, during such a biting operation, slips readily over the end of the guard element 18, and is thereafter prevented from disengagement therefrom until such disengagement is brought about by the fisherman himself.

In the construction shown in Figures 4, 5, and 6, the fish hook B is of composite construction, being partly of heavy stock and partly of relatively light stock. The heavy part includes an elongated shank 30 merging into a curved portion 32 which is provided with a pointed extremity 34. A guard shank 36, which may be of appreciably lighter weight material, is provided with a guard element 38 at one end. The end of the shank 30 may be bent upon itself at the end opposite from the curved portion 32 to form an eye 40 for the purpose of connecting the fishing line thereto. The end of the shank 36 lying opposite the guard element 38 is secured to the shank 30 adjacent the eye 40 either by welding or a mechanical fastening means. While in most instances it will be preferable to weld the two shanks together, a recommended fastening means includes loop means in the form of a metallic band 42 in tight engagement with the shanks 30 and 36. As shown in Figure 4, the band 42 is suitably crimped in order to provide a firm anchoring arrangement of the two shanks 30 and 36.

As in the case of the fish hook A, the shank 36 of the instant hook B is bent at 44 and bowed at 46 intermediate the band 42 and said bent section 44. A ring 48 is thereby limited in movement toward the guard element 38 by the bent portion 44 and is limited in its reverse movement toward the eye 40 by virtue of the band 42. In order to provide an outward bias in the shank 36, the shank is bent slightly at 50.

The functioning of the hook B is identical with that of the previously described hook A. When the ring 48 is moved to the position assumed in Figure 6, the shank 36 is permitted to diverge due to the biasing relationship thereof with respect to the hook shank 30. Conversely, when the ring 48 is moved to the position shown in Figure 5, the shank 36 is urged into substantial side by side relationship with the shank 30, thereby closing the guard element 38 with respect to the curved portion.

In that the shank 36 is of fairly light weight material, the guard element 38 is easily deflected by a fish, even though the shank 30 is of comparatively heavy material. Therefore, it will be understood that the fish hook B is capable of catching quite large fish, although the shank 36 is deflected as easily as is the shank 16 of the first described hook A. Accordingly, the fish hook B may be baited as readily as the fish hook A, this being by virtue of the relative resilience and lateral bias of the comparatively light weight shank 36.

In conclusion, it should be understood that in both the foregoing description and in the claims the curved portions 12 and 32 of the hooks A and B are referred to as being generally in a single plane only for the purpose of ready explanation and reference. In actual practice, however, these curved portions 12 and 32 do not lie in strictly a single plane, as will be apparent from Figures 2, 3, 5 and 6, for the points 14 and 34 are slightly off-set from the general axes of both hooks A and B.

While I have shown two preferred forms of my invention, it is to be understood that various changes may be made therein by those skilled in the art without departing from the spirit of the invention as defined in the appended claims.

I claim:

1. A fish hook comprising a curved portion having a point at one end, a hook shank portion connecting with said curved portion, a guard portion engageable with only one side of said curved portion, a guard shank portion connecting with said guard portion, said guard shank portion being biased laterally relative to said curved portion, a promontory bend on said guard shank, loop means connecting the shank portions at a locus spaced from their respective curved and guard portions, a line engaging element at the end of said hook shank opposite the curved portion and means spaced from one said line engaging element slidably embracing said shank portions between said promontory bend and said loop means.

2. A fish hook comprising a pair of shank elements, loop means connecting said shank elements adjacent one end to hold said shank elements in one plane, said shank elements being biased away from each other substantially in said one plane, a curved hook portion carried by one of said shank elements, line engaging means at said one end of said shanks, said curved portion residing in a plane substantially normal to said first mentioned plane, a promontory in one of said shank elements, a guard portion carried by the other shank element, the guard portion extending toward said curved portion, and means independent of said line engaging means slidably engaging said shank elements between said loop means and said promontory.

3. A fish hook comprising a hook shank, a curved hook section on one end of said shank, said hook section having a pointed extremity, a guard shank, a guard element on one end of the guard shank, means connecting the other end of the shanks to support the shanks in a plane substantially normal to the general plane of said hook section, said connecting means comprising a line engaging means, said guard shank being biased into diverging relation away from said hook shank and said pointed extremity, and collar means slidably embracing said shanks to move said guard element toward said curved hook section when said collar means is moved toward said guard element.

4. The structure described in claim 3 in which one of said shanks is provided with means for limiting movement of said collar means toward said guard element, said limiting means being spaced from said guard element.

5. The structure described in claim 3 in which the first mentioned means limits movement of said collar means in a direction away from said guard element.

6. A fish hook comprising a hook shank, a curved hook section on one end of said shank, a guard shank, a guard element on one end of the guard shank, a loop element connecting the other end of each shank, said loop element forming a line engaging means, said loop element residing in the plane of said shanks and in a general plane substantially normal to the plane of said curved hook section, said guard shank being bent outwardly to form a promontory at a locus intermediate said guard and loop elements, and ring means independent of said line engaging means slidably embracing said shanks in the region defined between said loop element and said promontory, said guard shank being biased into diverging relation with said hook shank when said ring means is positioned adjacent the loop element and being urged toward said hook shank when said ring means is positioned adjacent the promontory.

7. The structure described in claim 6 in which the guard shank is bowed outwardly in the region lying between said loop element and said promontory.

References Cited in the file of this patent

UNITED STATES PATENTS

| | | |
|---|---|---|
| 556,694 | Robinson | Mar. 17, 1896 |
| 778,875 | Mathews | Jan. 3, 1905 |
| 863,272 | Gebhardt | Aug. 13, 1907 |
| 1,323,394 | Jones | Dec. 2, 1919 |
| 2,176,820 | McConnell | Oct. 17, 1939 |
| 2,234,516 | Clark | Mar. 11, 1941 |
| 2,570,468 | Matthes | Oct. 9, 1951 |